(12) United States Patent
Wright et al.

(10) Patent No.: US 11,983,469 B2
(45) Date of Patent: May 14, 2024

(54) COMPUTER-IMPLEMENTED METHOD OF MODELLING A HYDRAULIC NETWORK

(71) Applicant: INFLOWMATIX LTD, Hampshire (GB)

(72) Inventors: Robert Wright, Surbiton (GB); Mike Williams, Hampshire (GB); Joost Maas, Portsmouth (GB)

(73) Assignee: INFLOWMATIX LTD, Hampshire (GB)

( * ) Notice: Subject to any disclaimer, the term of this patent is extended or adjusted under 35 U.S.C. 154(b) by 357 days.

(21) Appl. No.: 17/286,273

(22) PCT Filed: Oct. 18, 2019

(86) PCT No.: PCT/GB2019/052992
§ 371 (c)(1),
(2) Date: Apr. 16, 2021

(87) PCT Pub. No.: WO2020/079455
PCT Pub. Date: Apr. 23, 2020

(65) Prior Publication Data
US 2021/0357547 A1    Nov. 18, 2021

(30) Foreign Application Priority Data

Oct. 18, 2018   (GB) .................................. 1817011.8

(51) Int. Cl.
*G06F 30/18*     (2020.01)
*G06F 111/10*    (2020.01)
(Continued)

(52) U.S. Cl.
CPC .......... *G06F 30/18* (2020.01); *G06F 2111/10* (2020.01); *G06F 2113/14* (2020.01);
(Continued)

(58) Field of Classification Search
CPC .................. F23N 2225/06; E05F 15/47; E05F 2015/487; G06F 30/18; G06F 2113/14;
(Continued)

(56) References Cited

U.S. PATENT DOCUMENTS 4,727,748 A  *  3/1988  Horigome ........... G01M 3/2807
                                                                    73/40
8,175,859 B1    5/2012  Wu et al.
(Continued)

FOREIGN PATENT DOCUMENTS

WO    2013/026731 A1    2/2013
WO    2018/044461 A1    3/2018

OTHER PUBLICATIONS

International Search Report & Written Opinion dated Nov. 21, 2019 for PCT Application No. PCT/GB2019/052992, 10 pages.

*Primary Examiner* — Kibrom K Gebresilassie
(74) *Attorney, Agent, or Firm* — Dorsey & Whitney LLP

(57) ABSTRACT

A computer-implemented method of modelling a hydraulic network comprising pipes and pressure monitoring points, the method comprising: creating a model comprising a plurality of nodes and a plurality of edges connecting the nodes; wherein each node represents a pressure monitoring point within the hydraulic network, and each edge connects two nodes and represents an amalgamation of the pipes of the network that span between the pressure monitoring points represented by the two nodes.

20 Claims, 9 Drawing Sheets

(51) Int. Cl.
*G06F 113/14* (2020.01)
*G06Q 10/04* (2023.01)
*G06Q 10/067* (2023.01)
*G06Q 50/06* (2012.01)

(52) U.S. Cl.
CPC ........... *G06Q 10/04* (2013.01); *G06Q 10/067* (2013.01); *G06Q 50/06* (2013.01)

(58) Field of Classification Search
CPC .. G06F 2111/10; G06Q 10/04; G06Q 10/067; G06Q 50/06
See application file for complete search history.

(56) References Cited

U.S. PATENT DOCUMENTS

| | | | | |
|---|---|---|---|---|
| 2003/0033117 | A1* | 2/2003 | Sage | G06F 30/13 |
| | | | | 702/182 |
| 2011/0191267 | A1* | 8/2011 | Savic | G06Q 50/06 |
| | | | | 705/412 |
| 2016/0252422 | A1* | 9/2016 | Howitt | G01M 3/2807 |
| | | | | 73/40.5 A |
| 2018/0039290 | A1* | 2/2018 | Shafiee | G06Q 50/06 |
| 2018/0196399 | A1* | 7/2018 | Rasekh | G05B 13/042 |

* cited by examiner

COMPUTER-IMPLEMENTED METHOD OF MODELLING A HYDRAULIC NETWORK

This application is a national stage application under 35 U.S.C. § 371 of International Application No. PCT/GB2019/052992 filed 18 Oct. 2019 entitled "Computer-Implemented Method of Modelling a Hydraulic Network," which claims priority to Great Britain Patent Application No. 1817011.8 filed 18 Oct. 2018. The contents of each of these applications are hereby incorporated herein in their entirety by reference for all purposes.

FIELD

The present disclosure relates to a method of modelling a hydraulic network and to a hydraulic network model.

BACKGROUND

Hydraulic network models are used by water companies to understand the behaviour of their water distribution networks and undertake predictive work. Typical use cases include the management of large incidents (e.g. bursts where customers lose supply), design work for new consumers of a network, and planning new ways for a network to be configured or controlled for better efficiencies.

Traditionally, network models are very detailed and incorporate vast numbers of pipes spanning most streets in urban environments, as well as rural areas, and the backbone of the network (i.e. large pipes from reservoirs and other water sources). The models are represented as mathematical graphs containing nodes and edges with various parameters. The parameters typically include water consumption data, residential and commercial properties, control information, elevations, and the lengths, diameters and roughness of pipes.

Determining such parameters (known as model calibration) is an expensive, time consuming, and typically manual activity. Consequently, water companies cannot re-calibrate their traditional network models often, resulting in network models that are often outdated and not accurate. For example, it is not unusual for a traditional network model to be up to 10 years old. There is therefore a need for a method of modelling hydraulic networks which is more dynamic such that the resulting models may be calibrated more easily.

A known approach is to build a lower resolution network model from the full network model, such as the previously described traditional network model. This is done by applying a simplification process to the full network model. By simplifying the full network model, the number of hydraulic equations that represent the model will be reduced, and it may then be possible to apply a simpler approach to calibrating the network. However, the requirement to have a full network model at the beginning of this analysis results in a number of disadvantages, such as the fundamental requirement for the full network model. This is problematic because not all water companies globally will have full hydraulic network models for their systems, or—if they do—such models may be low quality or inaccessible.

Furthermore, simulation of the hydraulic network is important because the behaviour of a hydraulic network can change daily. Water companies currently use strategically placed monitoring to obtain a live view of the behaviour of their networks. A typical configuration is the establishment of discrete zones in the network, sometimes termed district metered areas (DMA), and the installation of flow meters at the inlets of such zones, so that water companies can understand—on a daily basis—the demands on a particular zone, such as water consumption and leakage. The disadvantage of such known approaches however is that the live insight into the network is at a coarser level than in the previously described traditional hydraulic network models. For example, the zones that have been set up typically contain anywhere up to 5,000 properties. There is therefore a need for a method of modelling hydraulic networks which provides a compromise between resolution of the model and dynamicity of the model.

Simulation using full hydraulic network model simulation software is meanwhile limited by the dependence on the full network model. For example, simulation of this kind is limited by the ability to update parameters in the full network model due to the vast number of parameters involved in the full network models and the limited number of sensory points within the network.

A known alternative approach for determining the current state within a water network and alerting a water company to anomalies is noise logging. Noise logging is an acoustic noise measuring technique in which the acoustic noise generated by fluids in the network is recorded by noise logging tools. Noise logging can help to identify and localise new leaks and bursts, based on the noise results. There are several disadvantages to noise logging, however, which include:

- Lots of noise loggers are required. That is, noise loggers require very dense deployments to achieve localisation of newly occurring leaks. This adds complexity and cost to the network.
- Noise loggers do not provide estimates of the size of the leak, i.e. noisy leaks do not correlate with large leaks. This means that noise loggers provide only a simple indication of the occurrence of a leak; rather than detailed information about the leak.
- Because the size of a burst can't be estimated, logging of a leak by a noise logger does not directly facilitate calibration of network models.

There is therefore a need to provide a method of modelling hydraulic networks which allows for improved simulation of the network to allow for improved detection of leaks, for example.

Finally, pressure regulation and control in hydraulic networks is another aspect important to the management of hydraulic networks. A known approach is to minimise pressure in the network via valve control and pressure monitoring at the critical point (CP) in the network (the CP being the point in the network with the lowest pressure) by building statistical relationships of how a control valve needs to react based on the pressure monitoring and flow measurements at the valve (but without building hydraulic models). As a result, this approach can't understand resistances or demands within a network and, in order to control multiple points in a zone, the single CP problem must be solved multiple times. For completeness, resistance in the network is a parameter relating the amount of energy lost in water flowing between two points in the network.

It is desirable to address these issues.

SUMMARY

Aspects of the invention are set out in the independent claims. Optional features of aspects are set out in the dependent claims.

According to an aspect, there is provided a method of modelling a hydraulic network, the hydraulic network comprising pipes and pressure monitoring points, and the method comprising: creating a model comprising a plurality of nodes and a plurality of edges connecting the nodes; wherein each node represents a pressure monitoring point within the hydraulic network, and each edge connects two nodes and represents an amalgamation of the pipes of the network that span between the pressure monitoring points represented by the two nodes.

The method may be computer-implementable, and thus may be computer-implemented.

Advantageously, this results in a compact model of the hydraulic network. Such a compact model reduces the burden on computing resources by (a) occupying less memory space when in storage, and (b) reducing processor burden. Processor burden is reduced because, due to the model's compact size, simulations of the hydraulic network using the model are less processor intensive than simulations involving full network models, for example. As a result, further technical effects include: shorter computing times; the ability to simulate hydraulic networks on smaller computer systems and/or lower power computer systems; and the ability to simulate larger networks.

The number of pipes in the hydraulic network may be significantly more than the number of edges in the model. The number of pressure monitoring points may be equivalent to the number of nodes in the model. The number of pressure monitoring points may be more than the number of nodes in the model.

The pressure monitoring points may be live pressure monitoring points. A device arranged to monitor the pressure of fluid in the hydraulic network may be arranged at each of the live pressure monitoring points.

The method may comprise calculating one or more parameters based on the model. The parameter(s) may be the demand at a node and/or the resistance for an edge. The method may comprise automatically calculating the one or more parameters.

The method may comprise using the model to calculate the demand at a node in order to identify a burst at or near the pressure monitoring point represented by the node.

The method may comprise using the model to calculate the resistance for an edge in order to identify a blockage in the pipes represented by the edge.

Calculating the one or more parameters based on the model may comprise performing regularisation of the model such that the one or more parameters may be calculated. Regularisation of the model may be performed when there are mathematical unknowns in the model.

The method may comprise calculating the demand at a node. The demand may be a time dependent parameter. The demand may represent the combined water consumption and/or leakage at or near the pressure monitoring point represented by the node. The method may comprise calculating the demand at a plurality of the nodes in the model. The method may comprise calculating the demand at each of the nodes in the model.

The method may comprise calculating the resistance for one or more of the edges. For each edge, the resistance may relate to—e.g. be indicative of—the amount of energy lost in fluid, such as water, flowing between the pressure monitoring points represented by the nodes at the ends of the edge. The resistance may be calculated for a plurality of the edges in the model. The resistance may be calculated for each of the edges in the model.

The method may comprise automatically calibrating the model. The model may be automatically calibrated using a numerical optimization approach.

The method may comprise calculating a parameter for a node or edge for a first time period and for a second time period. The first and second time periods may be different. The first and second time periods may be non-overlapping periods. The first and second time periods may be adjacent time periods.

The method may comprise recursively updating the model parameters. The method may additionally or alternatively comprise monitoring the parameter calculations or estimations. That is, monitoring the estimated demand(s) and/or resistance(s). Further, the method may comprise generating alerts to identify changes or variations in the parameter estimations. The changes may be significant changes. The parameter estimations may be monitored by comparing the parameter estimation for a node or an edge for a first time period with the parameter estimation for the node or edge for the second time period. An alert may be generated when the parameter estimations are not substantially equal. For example, when the estimations are not exactly equal or are outside of usual system tolerances.

An alert may be generated when the parameter estimation for a given node or edge is not substantially equal to a previous estimation of the same parameter for the same node or edge. An alert may be generated when the parameter estimation for a given node or edge is not exactly equal to a previous estimation.

A variation in demand at a node may be indicative of a burst at or near the pressure monitoring point represented by the node.

A variation in resistance for an edge may be indicative of a blockage in the pipes represented by the edge.

The parameter(s) may be calculated over a given period of time. The period may be a 24-hour period. The previous estimation may be an estimation for the immediately previous period: for example, the immediately previous 24-hour period. Alternatively, the previous estimate may be an estimate for a period previously identified as being representative of the steady at the node and/or edge.

The model may be a model of a zone of the hydraulic network. The zone may comprise one or more fluid inlets. There may be a flow meter arranged at each inlet to the zone. Each flow meter may be configured to measure the flow of fluid entering the zone at its respective inlet. There may be a node at each of the inlets to the zone.

The parameter(s) may be calculated, at least in part, based on flow data from the or each flow meter. That is, the flow data may be an input to the model. Additionally or alternatively, the parameter(s) may be calculated, at least in part, based on pressure data from the pressure monitoring points. That is, the pressure data may be an input to the model.

The demand at a node and/or the resistance at an edge may be calculated from the model based on data collected at the or each flow meter and data collected at the pressure monitoring points.

The method may comprise detecting a burst in the hydraulic network using the model. A burst in the hydraulic network may be detected based on a change or variation in estimated demand at a node of the model.

The edges may be generated (i.e. the representations of the amalgamations of the pipes of the network may be generated) by mathematically reducing existing pipe topology data. The existing pipe topology data may be mathematically reduced using Kron Reduction and/or Delta-Wye Transformation. Alternatively or additionally, the edges may be generated manually. Alternatively or additionally, the edges may be generated using a statistical approach.

According to another aspect, there is provided a computer-readable medium comprising instructions executable by a processor to perform the method.

According to another aspect, there is provided a computer program product comprising instructions which, when the program is executed by a computer, cause the computer to carry out the steps of the method.

According to another aspect, there is provided a model of a hydraulic network, the hydraulic network comprising pipes and pressure monitoring points, the model comprising: a plurality of nodes; and a plurality of edges connecting the nodes; wherein each node represents a pressure monitoring point within the hydraulic network; and each edge connects two nodes and represents an amalgamation of the pipes of the network that span between the pressure monitoring points represented by the two nodes.

The model may be used to calculate one or more parameters. As noted above, the parameter(s) may be the demand at a node and/or the resistance for an edge.

The network may comprise three pressure monitoring points and/or the model may comprise three nodes. The network may comprise five pressure monitoring points and/or the model may comprise five nodes.

According to another aspect, there is provided use of the model to calculate a demand of a node and/or a resistance for an edge of the model.

According to another aspect, there is provided use of the model to identify a burst and/or a blockage in the hydraulic network.

Optional features of each aspect may be optional features of each other aspect.

BRIEF DESCRIPTION OF THE DRAWINGS

Specific embodiments are described below by way of example only and with reference to the accompanying drawings, in which.

Throughout the specification, like reference numerals are used to describe like parts.

SPECIFIC DESCRIPTION OF CERTAIN EXAMPLE EMBODIMENTS

The invention outlined in this document, termed the equivalent network (EN) model, aims to fill the above described gap that exists between outdated but highly detailed network models, and live but very coarse network monitoring systems.

[Overview]

In summary, the EN model is an improved approach for modelling a particular zone of a hydraulic network which, by using information about fluid flows entering that zone and pressure readings taken throughout the zone, allows improved estimation of where fluid flow is leaving the zone. Fluid may leave the zone in a number of ways: for example, through customer demand and usage, background leakage, or newly occurring bursts. In the case of newly occurring bursts, the estimate of flow leaving the zone can be detected as an anomaly to previous estimates of flow leaving the zone at a particular location. By detecting these anomalies, the advantageous EN model can be used to alert water companies to new bursts before existing technologies (such as noise logging, which requires waiting one or two nights to detect and confirm bursts), and in a more localised way than traditional zonal flow monitoring (where an anomaly in zone inlet flow only tells a water company that a zone has a burst, not where in the zone that burst is located).

A hydraulic network is a system of interconnected pipes arranged to carry fluid, such as water. The fluid in the network may be pressurised. The hydraulic network may comprise at least one inlet arranged to receive fluid into the system. Water supply networks and water networks are examples of hydraulic networks.

A variation in demand that significantly deviates from the expected demand may be considered as an anomaly. As noted above, such anomalies may be indicative of bursts in the hydraulic network. Advantageously, the EN model may be used to identify such anomalies by: (a) estimating, using the model, an expected (forecasted) demand; (b) estimating, using the model, a new demand based on real-world conditions (e.g. flow data and pressure data); (c) comparing the expected demand to the new demand; and (d) if the estimate for the new demand is significantly higher than the estimate for the expected demand, identifying an anomaly.

EXAMPLE 1

Figure 1:
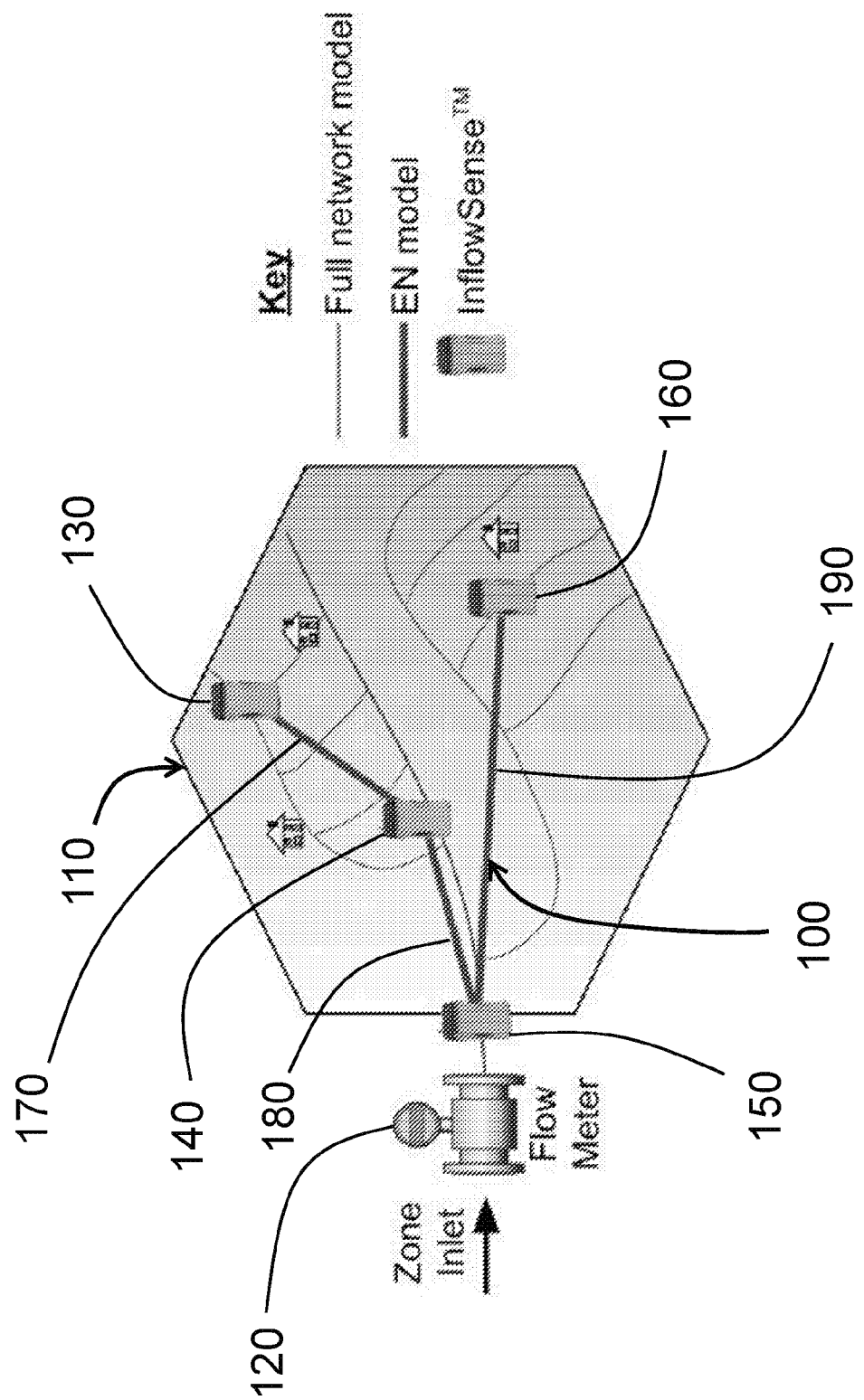
FIG. 1 shows an equivalent network model of a first water distribution zone overlaid with a full network model of the zone.

FIG. 1 shows an EN model 100 overlaid with a full network model 110 of a water distribution zone. The full network model 110 may be a traditional network model of the kind described above.

In this disclosure, a zone is defined as being a discrete area of a water supply network (i.e. a discrete area of a hydraulic network). Meanwhile, an inlet of a zone is the point where new water may enter the zone. In the UK, the most commonly formed zones are called district metered areas (DMA). The DMAs found in the UK are typically smaller than the zones of other countries in Europe, for example. A zone may have more than one inlet. In the UK, one inlet per DMA is most common.

Returning to FIG. 1, at the inlet to the physical zone represented by the EN model 100, there is provided a flow meter 120. To use the EN model 100 for simulations, flow data is required at the zone inlet. Typically, the flow data required and used with the EN model 100 is low frequency. Low frequency, in this example, means typically one measurement per 5 or 15 minutes (however, in other examples, the frequency may differ). Such flow data is usually readily available from most water companies.

As with full network models, where edges represent real pipes and nodes are the joining points between the pipes, the EN model 100 also includes nodes and edges. In FIG. 1, there are four nodes: a first node 130, a second node 140, a third node 150 and a fourth node 160. The first 130 and second 140 nodes are joined by a first edge 170. The second 140 and third 150 nodes are joined by a second edge 180. The third 150 and fourth 160 nodes are joined by a fourth edge 190. The third node 150 is located at the inlet to the zone.

The nodes 130, 140, 150, 160 of the EN model 100 represent live pressure monitoring points within the hydraulic network. Highly accurate pressure measurements are required for the numerical optimisation required of the EN model 100. One example apparatus for providing such accurate pressure measurements is the InflowSense® pressure sensing device sold by Inflowmatix Ltd. As described above, the EN model 100 shown in FIG. 1 comprises four nodes 130, 140, 150, 160, each represented by an icon of an InflowSense® pressure sensing device. The nodes 130, 140, 150, 160 are distributed throughout the zone. Water companies typically already have at least one pressure sensor in each of their zones in order to monitor customer service levels, but the number of sensors per zone is increasing, with three sensors becoming desirable. In some arrangements, there may five sensors.

The edges 170, 180, 190 in the EN model 100 represent pseudo pipes that connect the nodes 130, 140, 150, 160 of the EN model 100. The pseudo pipes represent amalgamations of the real pipes of the network that span between any two pressure monitoring points—that is, between any two nodes.

Use of the EN model 100 to estimate parameters relating to the modelled hydraulic network will now be described.

Advantageously, the parameters that can be estimated daily in the EN model 100 are equivalent to the counterpart parameters in the full network model 110. In more detail, at each node 130, 140, 150, 160 of the EN model 100, a time dependent parameter called the demand may be estimated. The demand represents the combined water consumption and leakage at or near a particular node 130, 140, 150, 160—that is, at or near this point in space. An increase in the demand at a node may be indicative of a real-world burst at or near the node, for example. For the pseudo pipes—that is, the edges 170, 180, 190 between nodes—a parameter called the resistance may be estimated. The resistance relates the amount of energy lost in water flowing between any two monitoring points—that is, nodes—in the EN model 100. An increase in resistance for an edge may be indicative of a real-world blockage in one of the pipes represented by the edge, for example. The resistance between two pressure monitoring points is affected by a number of real-world factors, such as: (1) the distance between the two pressure monitoring points—the larger the distance, the greater the resistance; (2) the diameter of the pipe(s) between the two pressure monitoring points—the smaller the diameter, the higher the resistance; (3) the roughness of the pipe(s) between the two pressure monitoring points—the rougher the pipe(s), the greater the fluid energy losses, and so the higher the resistance; and (4) the bends in the pipe(s) between the two pressure monitoring points—the more bends the fluid must negotiate, the greater the fluid energy losses, and so the higher the resistance. Accordingly, the EN model 100 can be used to detect and manage bursts and flow generally in the hydraulic network. The specific advantages of using the EN model 100 to detect and manage bursts and flow are discussed in detail below.

EXAMPLE 2

To aid the skilled person's understanding, a more detailed example of applying the described EN modelling to a publicly available full network model will now be provided. This example demonstrates the ability of EN modelling to alert to, and localise, bursts in water mains networks.

In this example, the full network model comes in EPANET format, which is an open source hydraulic simulation package. The full network model is known as, and will be referred to in this disclosure, as Fossolo.

Figure 2:
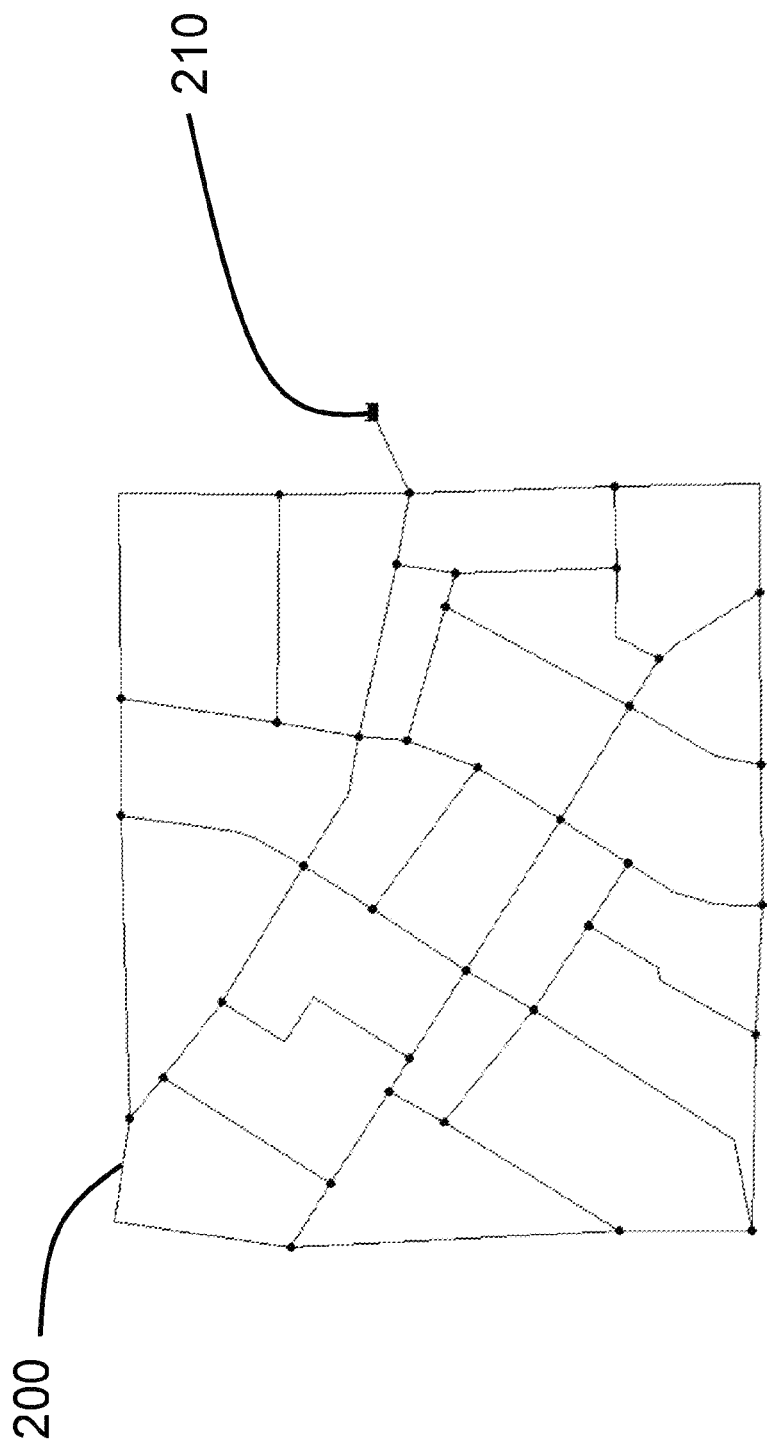
FIG. 2 shows a full network model of a second water distribution zone.

FIG. 2 shows the Fossolo network 200. The Fossolo network 200 comprises a number of nodes connected by pipes. The topology of the Fossolo network 200 will now be described.

The Fossolo network 200 has one inlet node 210, denoted mathematically no; 36 non-inlet nodes, denoted mathematically nn; and 58 pipes, denoted mathematically np. As noted above, the pipes connect the nodes. Together, the single inlet node 210, non-inlet nodes, and the pipes form a highly looped topology.

The Fossolo network 200 does not contain a design day consumer demand pattern. A design day consumer demand pattern is a customer usage pattern, typically represented over a 24 hour period, which is often used for design work relating to the hydraulic network, such as planning the installation of new control assets, such as valves, or understanding the effects of new housing developments on the network. The data upon which the design day consumer demand pattern is based (or used) is often very out dated. For example, it is not unusual for this data to be between 5 and 10 years' old. Because the Fossolo network 200 does not contain a design day consumer demand pattern, in order to generate the EN model, a pattern consisting of 96 points (i.e. one day split into 15 minute intervals) is applied. In other examples, a pattern consisting of a different number of points may be used. For example, a pattern consisting of 48 points may be used (i.e. one day split into 30 minute intervals). Alternatively, a pattern consisting of 144 points may be used (i.e. one day split into 10 minute intervals).

The first stage of EN modelling is to establish a reduced form topology containing only nodes that are pressure sensor points within the network. All inlet nodes must have flow data available. Monitoring the flow at network zone inlets is commonplace for water companies.

Figure 3:
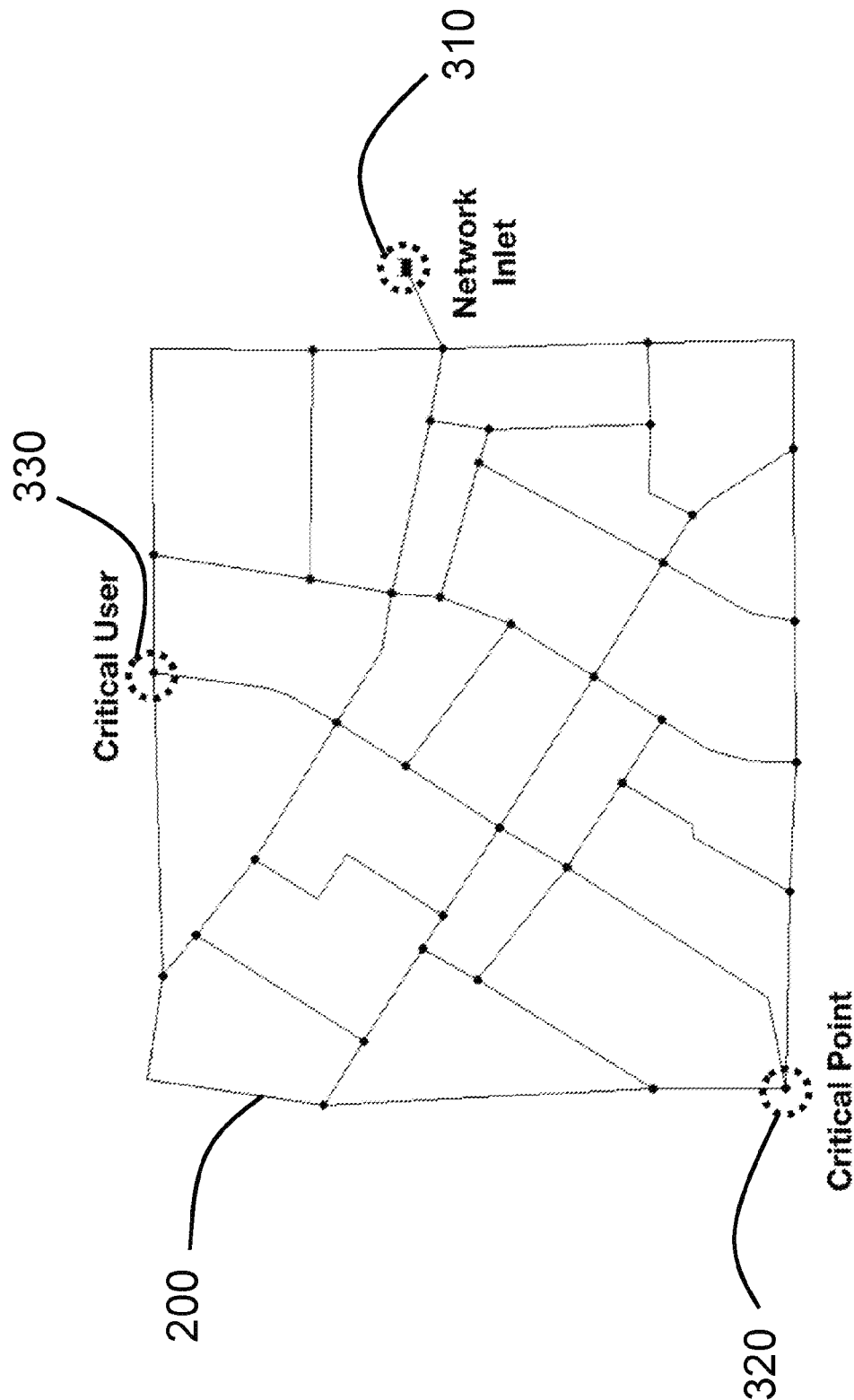
FIG. 3 shows the full network model of the second zone overlaid with features of an equivalent network model of the second zone.

Returning to establishing the reduced form topology, FIG. 3 shows the Fossolo network 200 annotated to identify, using circles, the nodes that are pressure sensor points within the network. Water companies often already have pressure sensors placed within their network and zones. Deploying such pressure sensors in an optimal way is a complex discipline and something that water companies do not typically undertake with advanced mathematical approaches. In this example, to generate the EN model, it is assumed that there are 3 pressure sensors within the network at locations generally of interest to a water company: a first node 310 at the network inlet; a second node 310 at the CP 320; and a third node 330 at a point in the network that represents a critical area or consumer.

Next, the remaining topology of the EN model is established. This can be done in a number of ways, including one—or a combination of—the following:

Using the pipe topology from water companies' records, for example their Geographic Information System (GIS), to mathematically reduce the network to a reduced form containing only the nodes of interest. Approaches for reducing the network in this way include Kron Reduction or the Delta-Wye Transformation. Guidance on both approaches may be found in the Electrical Engineering literature.

If the network is simple enough to do so, using knowledge of the network and domain expertise to manually select a topology.

Statistically inferring a topology based on both low and high resolution pressure data. For example, by examining how dynamic pressure changes travel through the network and are detected precisely at various time-synchronized sensors.

Using other sources of data and/or basic assumptions about the water network. For example, if it is assumed that the water network in a particular area of interest (a) does not contain closed valves, and (b) generally follows the street layout of a town or city, then the use of open source datasets such as OpenStreetMap could be used to identify the approximate connectivity between sensors. The assumption made in (b) is usually true since most consumers are on streets and network operators must generally be able to drive to locations throughout the network.

Figure 4:
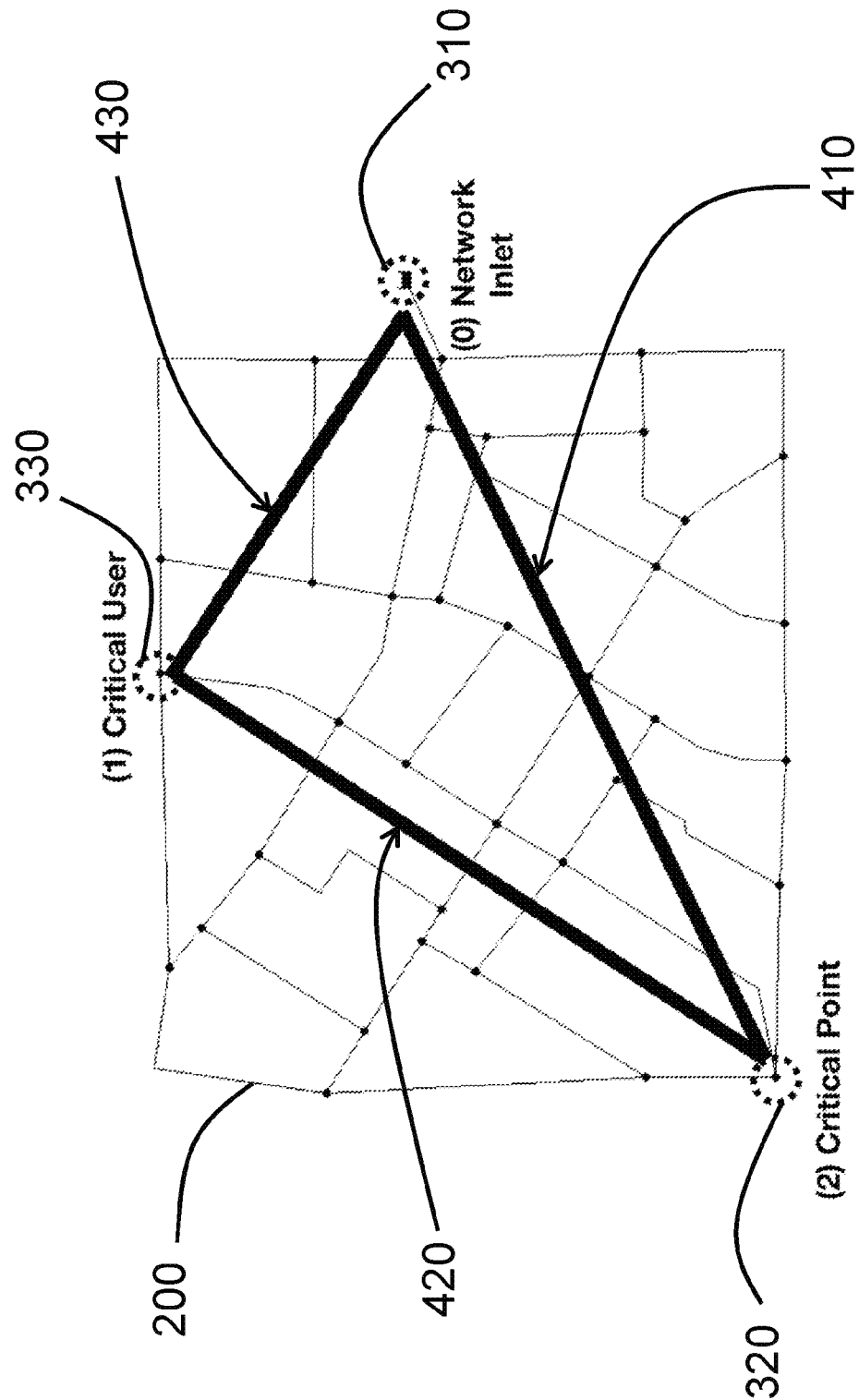
FIG. 4 shows the full network model of the second zone overlaid with the equivalent network model of the second zone.

Returning to the present example, because in this example the network is relatively basic and the total number of sensors is quite low, a reduced topology for the EN model is taken to be that shown in FIG. 4.

FIG. 4 shows the Fossolo network 200 overlaid with the determined EN model 400. The EN model 400 includes the previously described first, second and third nodes 310, 320, 330. In the EN model 400, the first node 310 is connected to the second node 320 by a first edge 410. The second node 320 is connected to the third node 330 by a second edge 420. The third node 330 is connected to the first node 310 by a third edge 430. Each of the edges 410, 420, 430 is a straight line between the nodes that the edge connects. As previously described, while the nodes 310, 320, 330 represent pressure sensor points in the system, each edge 410, 420, 430 represents a pseudo pipe which itself represents an amalgamation of the real pipes of in network which span between the two nodes that the edge connects.

The reduced topology of the EN model 400 may be mathematically represented using an incidence matrix. For this Fossolo network 200, and using notation similar to that described in the EPANET user manual (see above), the EN model incidence matrix is:

$$A_{12} = \begin{bmatrix} -1 & 1 & 0 \\ -1 & 0 & 1 \\ 0 & -1 & 1 \end{bmatrix}$$

Next, the topology of the EN model 400 may be used within a least squares optimisation solver to estimate a number of variables. In more detail, the least squares problem may describe (1) a number of variables that are of interest to estimate, and (2) a number of equations that will hold true (to some degree of error as computed by the least squares solver).

The equations described at (2) include principles related to conservation in hydraulics. In more detail, first, for every node in a network, mass conservation applies. That is, the amount of flow entering a node must be equal to the amount of flow exiting a node. This is under the assumption that the flow's mass is incompressible. This mass conservation may be represented by the following equation:

$$A_{12}^T q - d = 0$$

in which $d \in \mathbb{R}^{n_n+n_o}$ are the node 'demands' and denote the unknown outlet flow of the network due either to consumer use or bursts in the network, or to the known inlet flow at zone inlet points; and $q \in \mathbb{R}^{n_p}$ is the unknown flow rate for each pipe.

As previously described, the demand of a given node is a time dependent parameter which represents the combined water consumption and leakage at or near that node.

The unknown demands are the main variable of interest. This is because, by estimating the unknown demands from the optimisation problem, it is possible to identify anonymous demand or burst(s) in the system and raise a corresponding alert.

Second, for each edge (for example, for each of edges 410, 420, 430) in the network, energy conservation holds. It was shown in Pecci F, Abraham E, Stoianov II, 2017, Quadratic head loss approximations for optimisation problems in water supply networks (Journal of Hydroinformatics, Vol: 19, Pages: 493-506, ISSN: 1464-7141) that complex energy conservation relationships, such as Hazen-Williams or Darcy-Weisbach, can be approximated for a single pipe with good accuracy using only a quadratic. Consequently, for the described EN modelling approach, a quadratic head loss relationship is used to capture energy conservation across the reduced network—that is across the EN model 400:

$$A_{12} h + k q^2 = 0$$

In which $h \in \mathbb{R}^{n_n+n_o}$ are the nodal piezometric heads, which are formed from adding the known pressure data at each node in the network with its elevation relative to some datum, and $k \in \mathbb{R}^{n_p}$ are the assumed unknown edge resistances.

The elevation required to form the nodal piezometric heads can be measured in one—or a combination of—the follows ways: using field equipment; taken from existing water company records, such as GIS; and/or inferred by assessing the pressure data at multiple points in the network during a low flow (i.e. low energy loss) period, for example during the night.

The least squares optimisation problem uses the above described conservation equations to form a system where the unknowns are [nt×nn+np×(nt+1)], and the number of equations available is [nt×(np+nn+no), in which nt is the length of the time series of pressure and flow data used to form insight into the network. As noted above, nn is the number of non-inlet nodes; np is the number of pipes; and no is the number of inlet nodes.

Depending on the topology of the network analysed, the matrix formed for this system of equations may have full rank, or the matrix may require additional data or a small form of regularisation (both of which involve the resistances of the network).

Where GIS data is available, the GIS data may be used to define a resistance for each edge in the network. If GIS data is not available, for example it is missing, and in the absence of any other data, the example involves 'pushing' the resistances in a direction that makes the most logical sense. This is the approach undertaken in this specific example, where a small regularisation that penalises small resistances is applied. As a result, the demands of the EN model 400 may lose meaning in terms of their absolute values, however they will still be valuable for detecting anonymously high demands relative to previous estimates.

The above equations may be used to form A and b in the least squares problem [A x=b]. For a one source network (number=1), provided nt>np, there are more equations than unknowns. The least squares problem may then be solved for the Fossolo network 200 by using EPANET, for example, to simulate pressures and flows throughout the network. Example results of this simulation are shown in FIG. 5.

Figure 5:
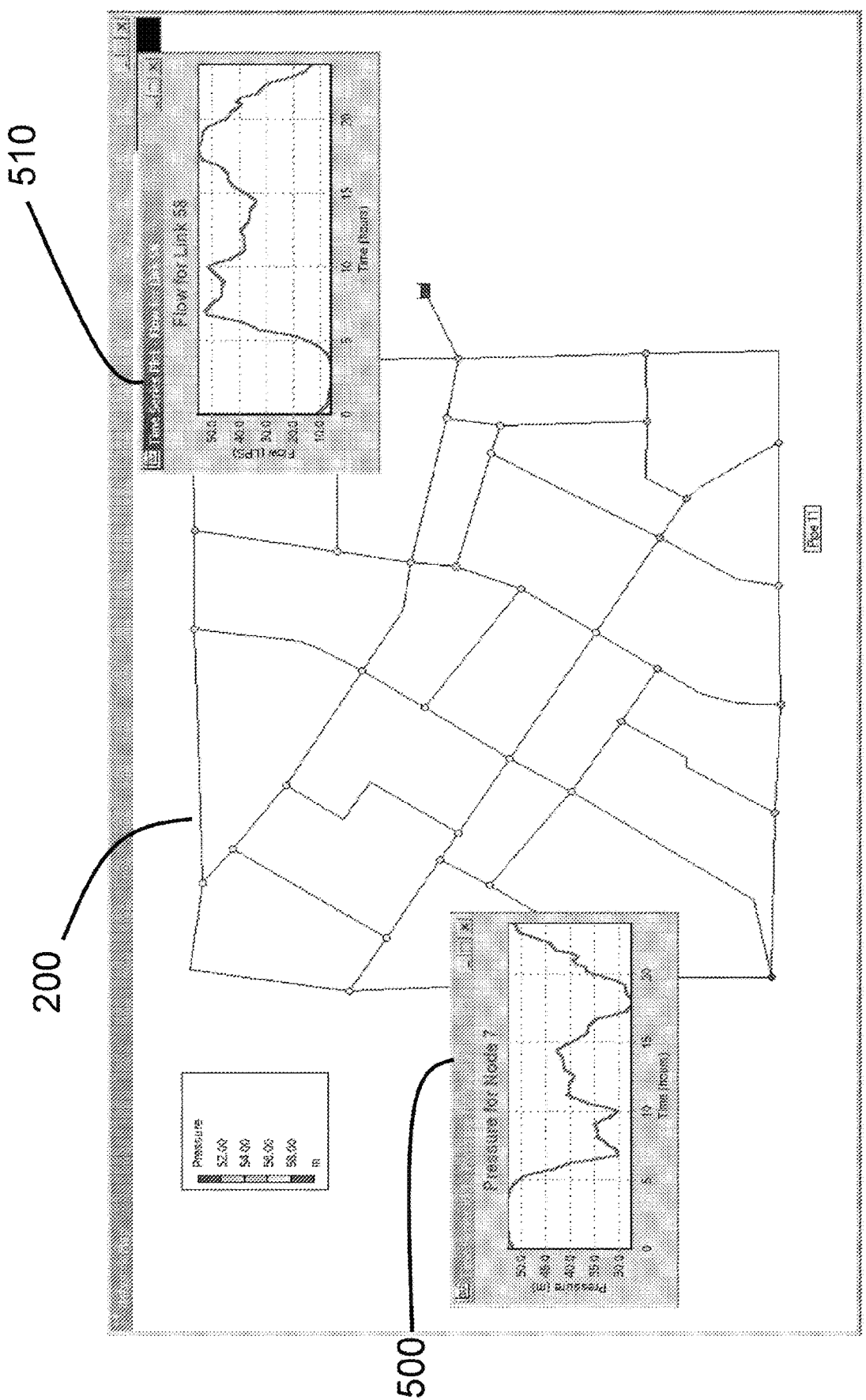
FIG. 5 shows an example of simulating pressures and flow through the full network model of the second zone.

FIG. 5 shows the Fossolo network 200 overlaid with a two graphs: a first graph 500 showing the pressure simulated at a node in the Fossolo network 200, and a second graph 510 showing the flow simulated at a link (that is, pipe) in the Fossolo network 200. The pressure is expressed in meters Vs time; whereas the flow is expressed in litres per second Vs time.

Next, only the simulated pressure and flow at the sensor points—that is, at the nodes 310, 320, 330—are selected as inputs to the EN model 400. These inputs are used to effectively minimise the difference between observations and modelled variables in the least squares problem. Then, demands at the second 320 and third 330 nodes are calculated, based on the design day data. The calculated demands are shown in FIG. 6.

Figure 6:
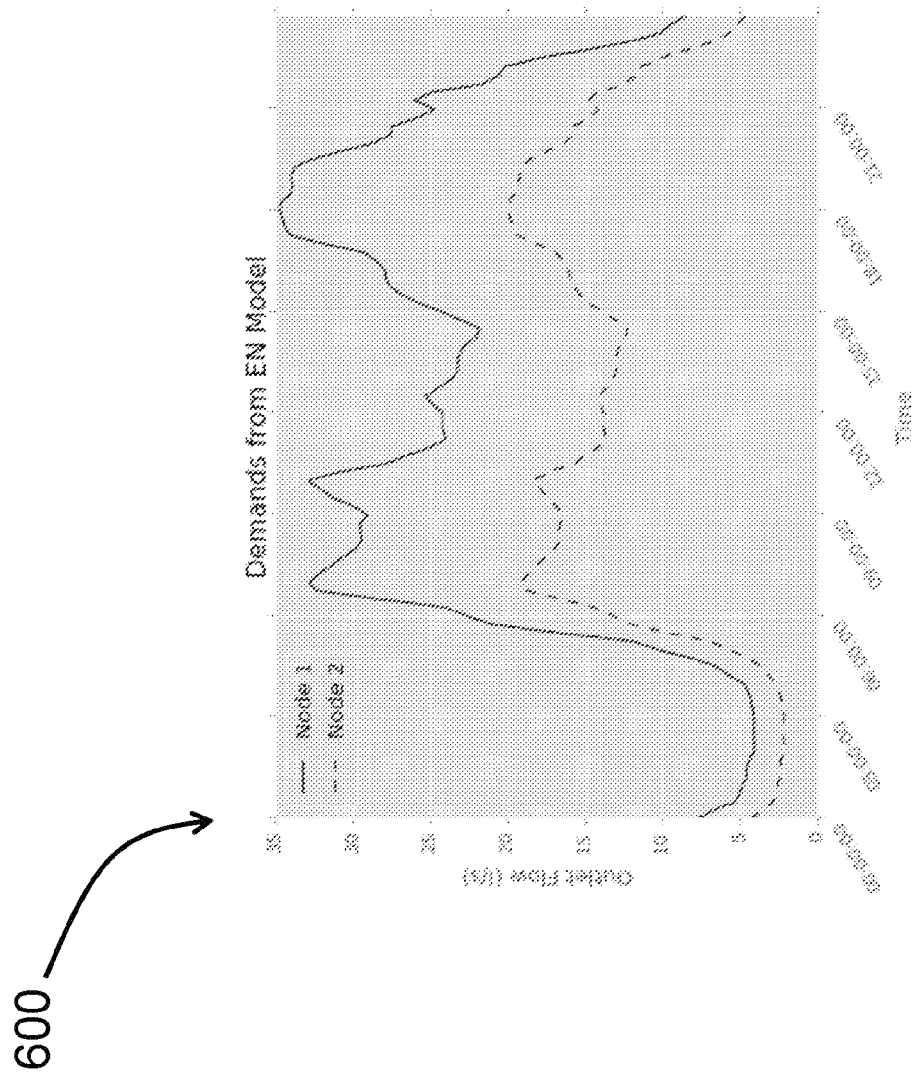
FIG. 6 shows a graph of flow demands at the first and second nodes of the equivalent network model of the second zone.

In more detail, FIG. 6 shows the outlet flow (in litres per second) over a 24-hour period at each of the second 320 and third 330 nodes. That is, FIG. 6 shows the outlet flow (in litres per second) over a first day. In FIG. 6, the demand at the third node 330 is represented by the line labelled "Node 1" and the demand at the second node 320 is represented by the line labelled "Node 2". For both nodes, the demand— that is, the outlet flow—is relatively low until around 6 am when a steep increase in demand is seen. Relatively high demand is then seen all day until around 8 pm when the demand begins to fall. A small reduction in demand is also seen between the hours of around 11 am and 3 pm. The demand profile at the two nodes over the first day is similar, although the overall demand at the second node 320 is lower than that at the third node 330. Overall therefore, FIG. 6 shows a typical consumer pattern in which demand is low during the night when people are sleeping, there is a peak in the morning when people wake up, and there is a further peak in the evening when people finish work and school.

Figure 7:
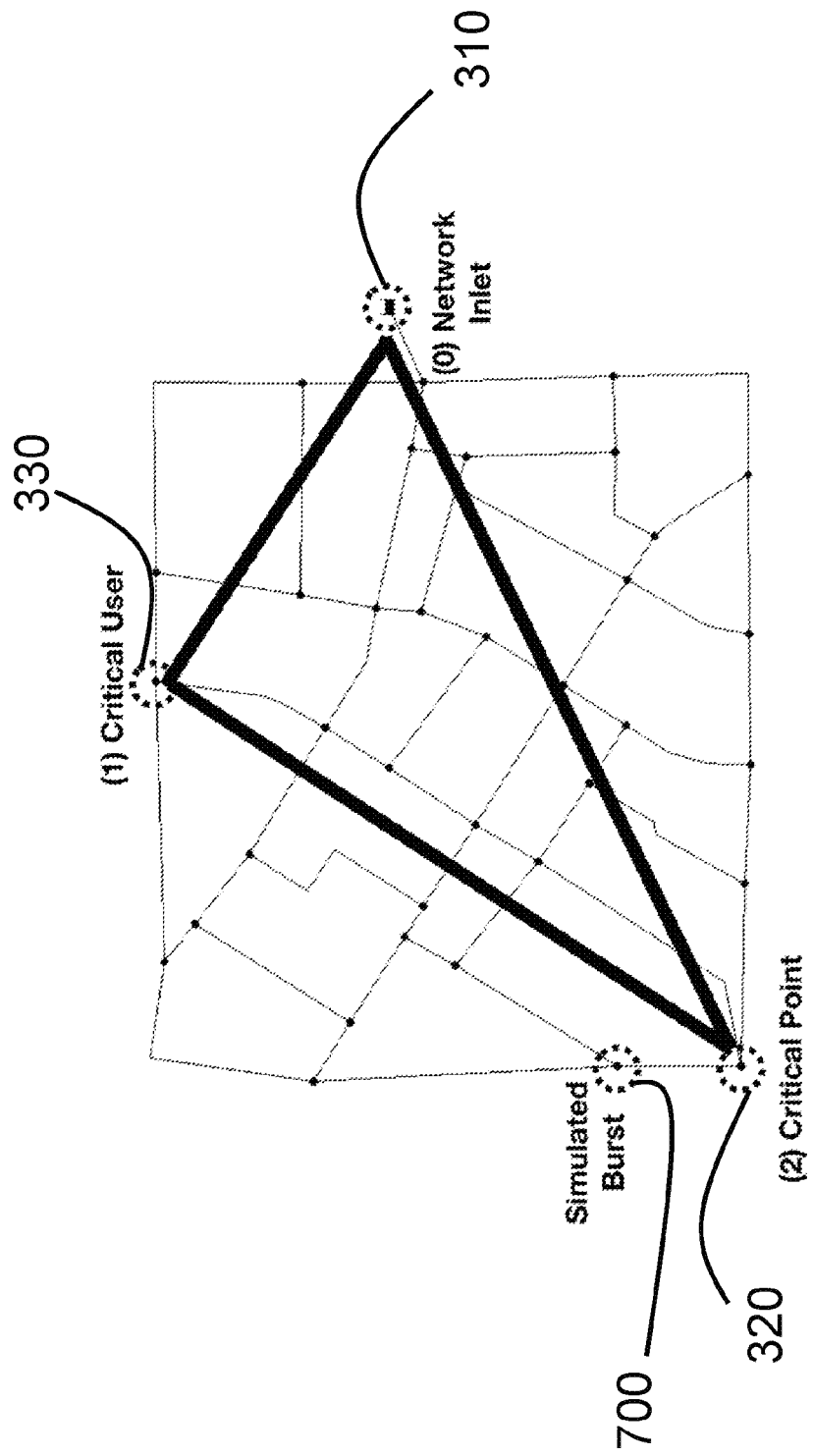
FIG. 7 shows the location of a simulated burst on the model of FIG. 4.

In order to demonstrate how the EN model 400 may be used for detecting an anomaly in demand e.g. a burst, the Fossolo network 200 is simulated for a second day. In the second day, a simulated burst of 1 litre per second is introduced at 12 pm near to the critical point. That is, near to the second node 320. FIG. 7 shows the location of the simulated burst 700 overlaid upon FIG. 4. The location of the simulated burst 700 is closer to the second node 320 than to either of the first 310 and third 330 nodes.

Figure 9:
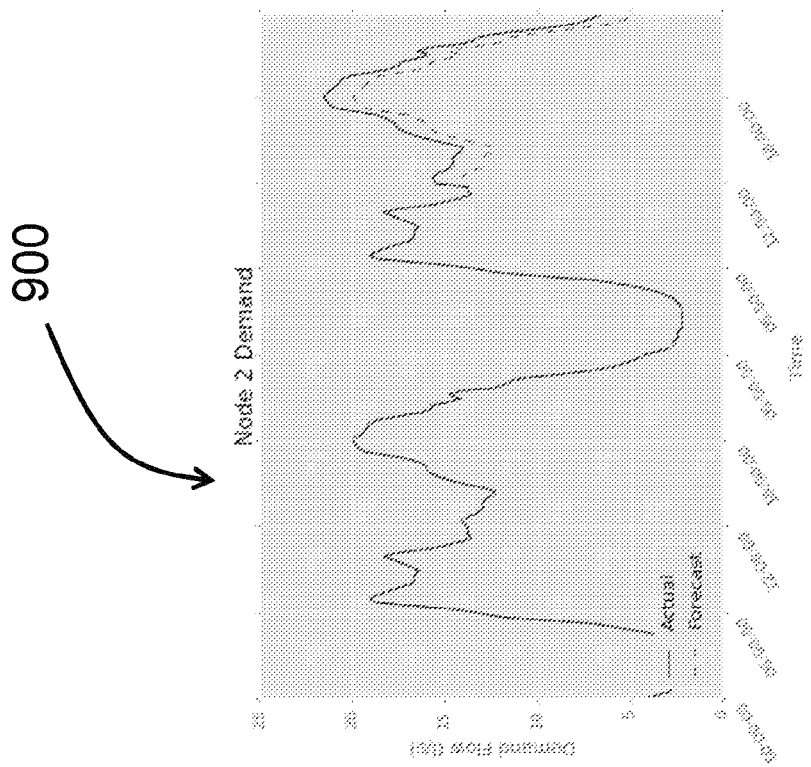
FIG. 9 shows a graph of flow demands at the second node in view of the burst.
Figure 8:
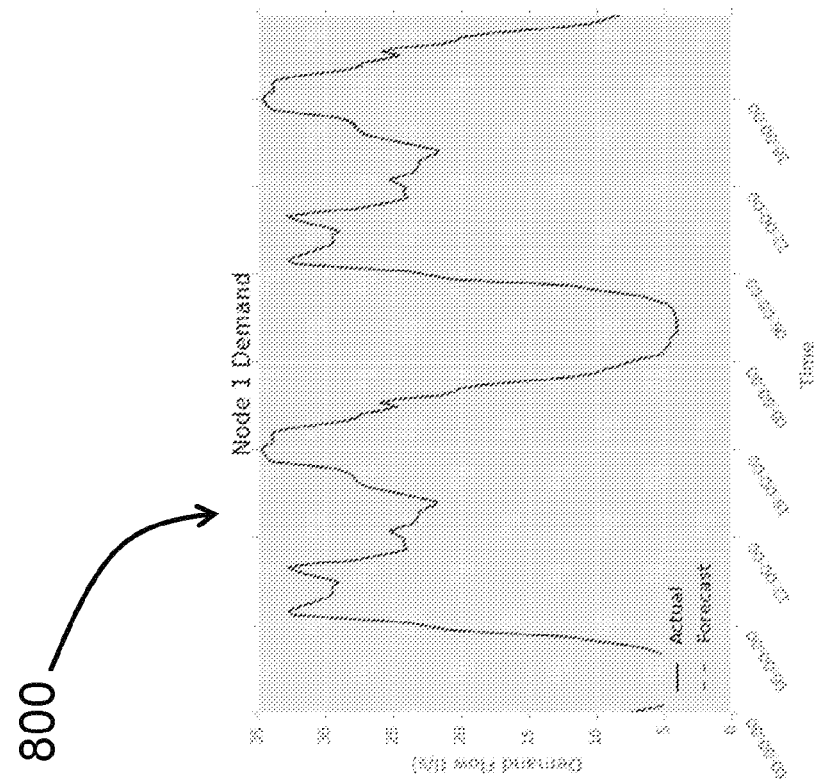
FIG. 8 shows a graph of flow demands at the first node in view of the burst.

FIGS. 8 and 9 show the corresponding forecasted and actual demands of each of the third 330 and first 310 nodes over the second day, respectively. The forecasted demand is based on the demand of the respective node on the first day. The actual demands are the modelled demands for the second day which are determined using the EN model 400 in substantially the same way as described above. FIGS. 8 and 9 both show the demand flow in litres per second over the 24-hour period which makes up the second day.

As shown by FIG. 8, the demand at the third node 330 on the second day is substantially the same as the demand at the third node 330 on the first day. In other words, according to the model, the burst event has not affected demand at the third node 330. FIG. 8 thus shows no discrepancy between the actual demand and the forecasted demand for the second day.

As shown by FIG. 9 however, the demand at the second node 320 on the second day varies from its demand on the first day. In particular, the demand at the second node 320 on the second day is higher between the hours of around 12 pm and 12 am than on the first day. Accordingly, the burst is visible at the second node 320. This is because the second node 320 is closer to the burst location 700.

[Method]

Figure 10:
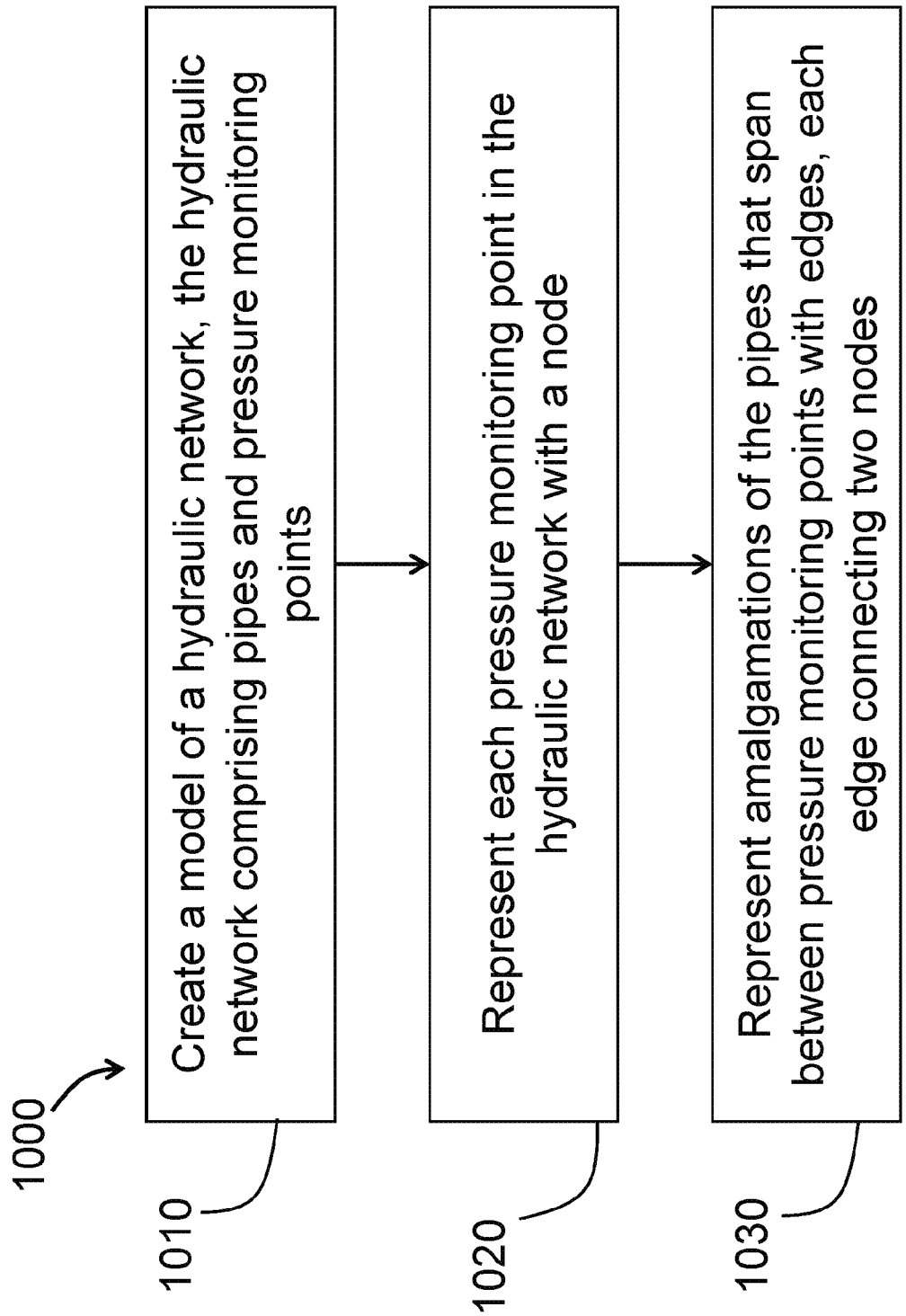
FIG. 10 shows a method of creating an equivalent network model of a hydraulic network.

FIG. 10 shows a method of modelling a hydraulic network 1000. Each of the steps of the method is represented by a box. The method 1000 involves creating 1020 a model of the hydraulic network, the hydraulic network comprising pipes and pressure monitoring points. Further, the method 1000 involves representing 1020 each pressure monitoring point in the hydraulic network with a node. Finally, the method 1000 involves representing 1030 amalgamations of the pipes that span between pressure monitoring points with edges, each edge connecting two nodes.

The method 1000 may be a computer-implemented method executable on a processor of a computer, for example. The model created by the method 1000 may be stored on a memory of the or a computer.

The method 1000 may further include modelling the hydraulic network using the created model to identify bursts in the hydraulic network, for example.

The method 1000 may further include modelling the hydraulic network using the created model to calculate the demand at a node and/or the resistance for an edge. The demand at a node may be used to identify a burst at or near the node.

[Alternatives]

Optionally, the above described example may be performed in conjunction with an optimal sensor placement approach. Adventurously, this maximises the performance of the described EN modelling approach. This is because, as a result of increasing the number of sensors in the network, smaller demand estimates are created for each node in the EN model 400, and therefore it becomes yet more simple to identify anonymous demand relative to the forecasted demand. In reality however, the approach must also be suitable for working with the existing sensor placements that the water company responsible for the hydraulic network has already selected because it will not always be feasible for the water company to purchase and install additional sensors. Accordingly, there are practical limitations to the optimal sensor placement approach.

Optionally, any number of pressure sensors may be used in the zone represented by the EN model. Thus, there may be any number of nodes in the EN model. For example, the actual number of pressure sensors may vary depending on the particular hydraulic network being modelled. For example, there may be three pressure sensors in the zone. Accordingly, there may be three nodes in the EN model for the zone. Alternatively, there may be five pressure sensors in the zone. Accordingly, there may be five nodes in the EN model for the zone.

Optionally, there may be any number of edges in the EN model.

The EN model may represent more than one zone. For example, the EN model may represent two, optionally adjacent, zones.

The term network in this disclosure refers to the hydraulic network. The terms network and hydraulic network are used interchangeably throughout this disclosure. Additionally, the word network may refer to an example of a hydraulic network, such as a water supply network.

The results of the EN model may be represented and/or visualised on a full network topology, such as a traditional network topology. Advantageously, this will have more intuitive meaning for a user of the technology.

The EN model itself may be represented and/or visualised on a full network topology, such as a traditional network topology. Advantageously, this will have more intuitive meaning for a user of the technology.

Each edge may represent an independent pipe route between two pressure monitoring points in the hydraulic network.

[Advantages]

The described EN modelling approach has numerous technical advantages, which include the following:

The EN model addresses the previously described shortcomings of zonal level monitoring and full network models. This is because, like full network monitoring, the EN model can be used to provide an up to date insight into the behaviour of a particular zone; however, unlike in full network monitoring, the EN model can be built and calibrated automatically multiple times per day. A numerical optimisation approach may be used to achieve this. Thus, a more accurate and dynamic modelling approach is provided, not least because the parameters of the EN model will be more up to date and relevant than the full network model counterparts. An advantage of the EN model over zonal level monitoring is that better spatial resolution is achieved. For example, the physical location of a burst within a zone may be identified, rather than simply the existence of a burst within a zone.

As previously described, the EN model may be used to give live hydraulic insight within a network zone, including localisation of:

bursts, background leakage, and unusual consumer demand; and/or resistances, blockages, and incorrectly throttled valves in the hydraulic network.

By feeding the parameter estimations of the EN model into a simple anomaly detection approach, alerts can be generated to identify significant changes in the parameter estimations. There are strong incentives for water companies to rapidly identify and localise newly occurring bursts, many of which are not visible at ground level. These incentives include financial and environmental. As the skilled person will appreciate, water is a valuable resource and it is highly desirable to limit water waste in the hydraulic network through bursts, for example. Furthermore, the identification of larger than necessary resistances in the network is also beneficial from both a financial and an environmental perspective. This is because water companies must provide enough pressure in the system to overcome such resistances, which leads to increased energy usage and higher levels of pressure dependent background leakage.

Further still, the EN models can be used for network control that drives better efficiencies. For example, an existing approach to managing pressure within discrete zones involves the continuous monitoring of two important points: the pressure reducing valve (PRV) near the zone inlet, which is used to control pressure within the zone; and the critical point (CP), where pressure is lowest in the zone. The approach towards monitoring typically includes: (1) gathering low resolution pressure data at both the PRV and CP (generally, 15 minute resolution data); and (2) gathering flow data at the PRV. Relationships can be established using this data to build optimised control information. The EN models can be used in this particular space and can also enable access to more advanced control schemes, where accurate network models are a requirement for their successful operation.

Furthermore, as previously noted, not all water companies globally have full hydraulic network models for their systems, or—if they do—such models may be low quality or inaccessible. A key advantage of the EN model is that it can be built and calibrated without the full hydraulic network model, and so may be built and calibrated regardless of the particular water company managing the hydraulic network or the water company's current capabilities, for example. This is because the EN model is created by starting with sensor data (for example, data from the pressure sensors) and the model is built up into the EN model; rather than starting with the full hydraulic network model and reducing that full model down, for example. This means that the barriers for creating EN models are reduced and so the previously described environment benefits of the EN model, for example, may be afforded regardless of the (lack of) information available for a hydraulic network.

A still further advantage of the EN model is that resistances and demands in the network can be understood using the EN model. As a result, multiple points in a particular zone may be controlled. This means that the single CP problem is solved multiple times. This is unlike in the previously described, simple approach where pressure is minimised in the network through valve control and pressure monitoring at the CP alone.

Overall, the EN model provides an improved means for detecting burst events. This is because it provides a compromise between speed, level of localisation and burden on computing resources. This is because, based on forecasts of demand (which assume that the network has a predictable pattern, which is typically true for most networks), simple logic can be formed and used to generate alerts (of, for example, burst events) sooner than when other technologies are used. For example, earlier than when minimum night flow monitoring or acoustic noise logging is used. Accordingly, bursts may be detected (and remedied) swiftly and, because simple logic may be used, the burden on computing resources is managed to within acceptable levels. Furthermore, the alert can include a form of localisation that is more accurate than just localisation to the entire zoned network. That is, the location of the burst may be identified more precisely than simply an identification to a given zone of the network. In comparison, minimum night flow monitoring process only localisation to the entire zoned network, for example. Accordingly, the level of localisation delivered is superior. Overall, the EN modelling approach therefore allows for faster and more accurate identification of burst events, which means that such bursts can be fixed by engineers more swiftly, reducing water loss from the hydraulic system.

Finally, as the skilled person will appreciate, hydraulic (e.g. water) networks are large in scale and have a very limited numbers of sensors. As a result, learning something about every pipe in the network (such as if a burst has occurred, or not) is challenging, and would not seem viable to the person skilled in the art. The disclosed EN modelling approach addresses this challenge by reducing the scale of the network and problem. For some hydraulic networks, there is then enough real-world sensor data to solve the problem exactly, which would not be obvious to the skilled person. For other network topologies, where there is still insufficient data to solve the problem exactly, additional assumptions (that is, regularisation) may be made with the EN model to solve the problem. The reason such additional assumptions may be made with the EN model is because, when calculating demands using the EN model, the demands do not need be accurate in the absolute sense; instead, they need only be accurate relative to previous estimates. That's because anomalies in demand (which may be indicative of bursts in the system), may be identified from the variation in demand estimates, rather than from the absolute values.

[Example Arrangements]

The disclosure comprises the subject matter described in the following clauses:

Clause 1. A model of a hydraulic network, the hydraulic network comprising pipes and pressure monitoring points, the model comprising: a plurality of nodes; and a plurality of edges connecting the nodes; wherein each node represents a pressure monitoring point within the hydraulic network; and each edge connects two nodes and represents an amalgamation of the pipes of the network that span between the pressure monitoring points represented by the two nodes.

Clause 2. A model according to clause 1, the network comprising three pressure monitoring points and the model comprising three nodes.

Clause 3. A model according to clause 1 or clause 2, wherein the pressure monitoring points are live pressure monitoring points.

Clause 4. A method of modelling a hydraulic network comprising pipes and pressure monitoring points, the method comprising: creating a model comprising a plurality of nodes and a plurality of edges connecting the nodes; wherein each node represents a pressure monitoring point within the hydraulic network, and each edge connects two nodes and represents an amalgamation of the pipes of the network that span between the pressure monitoring points represented by the two nodes.

Clause 5. A method according to clause 4, wherein the pressure monitoring points are live pressure monitoring points.

Clause 6. A method according to clause 5, further comprising calculating, at a node, a time dependent parameter known as a demand, wherein the demand represents the combined water consumption and leakage at or near the pressure monitoring point represented by the node.

Clause 7. A method according to clause 5 or clause 6, further comprising calculating a parameter known as the resistance for one or more of the edges, wherein, for each edge, the resistance relates to the amount of energy lost in water flowing between the pressure monitoring points represented by the nodes at the end of the edge.

Clause 8. A method according to any of clauses 5 to 7, further comprising automatically calibrating the model using numerical optimization approach.

Clause 9. A method according to any of clauses 5 to 8, further comprising: monitoring the parameter estimations; and generating alerts to identify significant changes in the parameter estimations.

The approaches described herein may be embodied on a computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

Features of the above implementations can be combined in any suitable manner. It will be understood that the above description is of specific implementations by way of example only and that many modifications and alterations will be within the skilled person's reach and are intended to be covered by the scope of the appended claims.

The invention claimed is:

1. A computer-implemented method of modelling a hydraulic network, the hydraulic network comprising pipes and pressure monitoring points, and the method comprising:
    simulating a pressure and a flow at each of the pressure monitoring points; and
    creating a model comprising a plurality of nodes and a plurality of edges connecting the nodes;
    wherein:
        the simulated pressures and the simulated flows are selected as inputs to the model; and
        each node represents a pressure monitoring point within the hydraulic network, and each edge is a line that connects two nodes and represents an amalgamation of the pipes of the network that span between the pressure monitoring points represented by the two nodes.

2. The method according to claim 1, wherein the model is a model of a zone in the hydraulic network, and wherein a flow meter is arranged at each inlet to the zone.

3. The method according to claim 1, wherein the method comprises detecting a burst in the hydraulic network using the model.

4. The method according to claim 3, wherein detecting a burst in the hydraulic network comprises detecting variation in estimated demand at a node of the plurality of nodes.

5. The method according to claim 1 comprising using the model to calculate a resistance for an edge of the plurality of edges in order to identify a blockage in the pipes represented by the edge.

6. The method according to claim 1 wherein the pressure monitoring points are live pressure monitoring points.

7. The method according to claim 1 comprising automatically calibrating the model using a numerical optimization approach.

8. The method according to claim 1 comprising calculating one or more parameters based on the model.

9. The method according to claim 8, wherein the one or more parameters comprise demand of a node and/or resistance for an edge.

10. The method according to claim 9, comprising calculating the demand at a node of the plurality of nodes.

11. The method according to claim 9 comprising calculating the resistance for an edge of the plurality of edges.

12. The method according to claim 8, wherein calculating the one or more parameters comprises performing regularisation of the model.

13. The method according to claim 8 comprising recursively updating the one or more parameters based on the model.

14. The method according to claim 9 comprising:
    calculating a parameter for a first time period and for a second time period; and
    comparing the parameter calculations for the first and second time periods.

15. The method according to claim 14, comprising:
    identifying a variation in the parameter calculations; and
    generating an alert indicative of the variation.

16. The method according to claim 15, wherein when the parameter is demand at a node of the plurality of nodes, the variation is indicative of a burst at or near the pressure monitoring point of the hydraulic network represented by the node; and/or when the parameter is resistance for an edge of the plurality of edges, the variation is indicative of a blockage in the pipes of the hydraulic network represented by the edge.

17. The method according to claim 8, wherein the one or more parameters are calculated, at least in part, based on flow data and/or pressure data.

18. The method according to claim 1, wherein each of the plurality of edges is generated by one or more of: mathematically reducing existing pipe topology data; manually generating the edges; and/or statistically generating the edges.

19. A non-transitory computer-readable medium comprising instructions executable by a processor to perform the method according to claim 1.

20. A system for modeling a hydraulic network, the hydraulic network comprising pipes and pressure monitoring points, the system comprising:

a processor; and a non-transitory computer readable medium comprising instructions that when executed cause the processor to:

simulate a pressure and a flow at each of the pressure monitoring points; and generate a model comprising:

a plurality of nodes; and a plurality of edges connecting the nodes;

wherein:

the simulated pressures and the simulated flows are selected as inputs to the model;

each node represents a pressure monitoring point within the hydraulic network; and each edge is a line that connects two nodes and represents an amalgamation of the pipes of the network that span between the pressure monitoring points represented by the two nodes.

* * * * *